(12) United States Patent
Yamamoto et al.

(10) Patent No.: US 7,771,526 B2
(45) Date of Patent: Aug. 10, 2010

(54) INK JET AQUEOUS INK, INK JET RECORDING METHOD, INK CARTRIDGE AND INK JET RECORDING APPARATUS

(75) Inventors: Tomoya Yamamoto, Awara (JP); Suzuka Ueno, Awara (JP); Yukiko Tachibana, Himeji (JP)

(73) Assignee: Canon Finetech Inc., Misato-shi (JP)

( * ) Notice: Subject to any disclaimer, the term of this patent is extended or adjusted under 35 U.S.C. 154(b) by 951 days.

(21) Appl. No.: 11/555,911

(22) Filed: Nov. 2, 2006

(65) Prior Publication Data

US 2007/0105980 A1 May 10, 2007

(30) Foreign Application Priority Data

Nov. 7, 2005 (JP) .............................. 2005-321776

(51) Int. Cl.
*C09D 11/02* (2006.01)
*G01D 11/00* (2006.01)

(52) U.S. Cl. ..................... 106/31.86; 347/100
(58) Field of Classification Search .............. 106/31.86; 347/100
See application file for complete search history.

(56) References Cited

U.S. PATENT DOCUMENTS

| 5,017,227 A | 5/1991 | Koike et al. ................... 106/22 |
| 5,059,246 A | 10/1991 | Yamamoto et al. ............. 106/22 |
| 5,082,496 A | 1/1992 | Yamamoto et al. ............. 106/22 |
| 5,110,356 A | 5/1992 | Shirota et al. ................. 106/22 |
| 5,123,960 A | 6/1992 | Shirota et al. ................. 106/22 |
| 5,127,946 A | 7/1992 | Eida et al. ..................... 106/22 |
| 5,130,723 A | 7/1992 | Yamamoto et al. ........... 346/1.1 |
| 5,135,570 A | 8/1992 | Eida et al. ..................... 106/22 |
| 5,139,573 A | 8/1992 | Yamamoto et al. ............. 106/22 |
| 5,167,703 A | 12/1992 | Eida et al. ................. 106/22 K |
| 5,178,671 A | 1/1993 | Yamamoto et al. ........ 106/22 K |
| 5,213,614 A | 5/1993 | Eida et al. ................. 106/22 K |
| 5,215,577 A | 6/1993 | Eida et al. ................. 106/22 K |
| 5,215,578 A | 6/1993 | Eida et al. ................. 106/22 K |
| 5,216,437 A | 6/1993 | Yamamoto et al. ........... 346/1.1 |
| 5,231,417 A | 7/1993 | Shirota et al. ............... 346/1.1 |
| 5,250,121 A | 10/1993 | Yamamoto et al. ........ 106/22 R |
| 5,258,505 A | 11/1993 | Eida et al. ................... 534/680 |
| 5,358,558 A | 10/1994 | Yamamoto et al. ........ 106/22 R |
| 5,451,251 A | 9/1995 | Mafune et al. ............ 106/22 H |
| 5,466,282 A | 11/1995 | Eida et al. ................. 106/22 K |
| 5,515,093 A | 5/1996 | Haruta et al. ............... 347/101 |
| 5,540,764 A | 7/1996 | Haruta et al. ............. 106/20 R |
| 5,658,376 A | 8/1997 | Noguchi et al. .......... 106/31.43 |
| 5,686,951 A | 11/1997 | Koike et al. ................. 347/106 |

(Continued)

FOREIGN PATENT DOCUMENTS

JP          6-107991         4/1994

(Continued)

*Primary Examiner*—Jerry Lorengo
*Assistant Examiner*—Veronica Faison Gee
(74) *Attorney, Agent, or Firm*—Fitzpatrick, Cella, Harper & Scinto (57) ABSTRACT

An ink jet aqueous ink mainly containing a water-insoluble coloring material, a water-soluble organic solvent, an auxiliary ingredient and water is characterized by containing as an auxiliary ingredient at least one ethylene oxide adduct of an ester of cholesterin, lanosterin or agnosterin and a hydroxyl fatty acid.

15 Claims, 4 Drawing Sheets

U.S. PATENT DOCUMENTS

| | | | |
|---|---|---|---|
| 5,764,261 A | 6/1998 | Koike et al. | 347/100 |
| 5,781,216 A | 7/1998 | Haruta et al. | 347/106 |
| 6,139,939 A | 10/2000 | Haruta et al. | 428/195 |
| 6,214,963 B1 | 4/2001 | Noguchi et al. | 528/71 |
| 6,552,156 B2 | 4/2003 | Noguchi et al. | 528/71 |
| 6,833,158 B2 | 12/2004 | Suzuki et al. | 427/149 |
| 6,843,839 B2 | 1/2005 | Kanke et al. | 106/31.47 |
| 7,008,671 B2 | 3/2006 | Ishikawa et al. | 427/152 |
| 7,507,283 B2 * | 3/2009 | Akatani et al. | 106/31.58 |
| 2005/0191446 A1 | 9/2005 | Ishikawa et al. | 428/32.34 |
| 2005/0197424 A1 | 9/2005 | Higashi et al. | 523/160 |
| 2005/0225617 A1 * | 10/2005 | Morioka et al. | 347/100 |
| 2006/0192826 A1 | 8/2006 | Yamamoto et al. | 347/100 |
| 2007/0032570 A1 | 2/2007 | Sato et al. | 523/160 |

FOREIGN PATENT DOCUMENTS

| | | |
|---|---|---|
| JP | 11-322866 | 11/1999 |
| JP | 11-322942 | 11/1999 |
| WO | WO 2005121263 A1 * | 12/2005 |

* cited by examiner

INK JET AQUEOUS INK, INK JET RECORDING METHOD, INK CARTRIDGE AND INK JET RECORDING APPARATUS

BACKGROUND OF THE INVENTION

1. Field of the Invention

The present invention relates to an ink jet aqueous ink, an ink jet recording method, an ink cartridge and an ink jet recording apparatus. More particularly, the present invention relates to a coloring material dispersion type aqueous ink showing a high ink ejection stability and a good color developability of a printed image and being suitable for ink jet recording, as well as a ink jet recording method using such an ink, an ink cartridge and an ink jet recording apparatus.

2. Description of the Related Art

While known popular ink jet inks are mostly aqueous inks using water-soluble coloring materials, water-insoluble coloring materials such as pigments that are excellent in terms of fastness of printed images such as water fastness and light fastness have been attracting attention. However, because water-insoluble coloring materials do not dissolve in water as a matter of course, they are generally used as coloring materials of non-aqueous inks. Japanese Patent Publication No. S53-3408 proposes a non-aqueous ink prepared by adding anonionic surface active agent such as cholesterin, lanosterin, agnosterin and lanopalmitic acid. However, a number of restrictions are posed on nonionic inks from the viewpoint of odor, health and safety when they are used as ink jet inks, because some organic solvent has to be used with them. In other words, such inks should be carefully handled. Thus, there is a demand for aqueous inks containing water-insoluble coloring materials. When a water-insoluble coloring material is used as a coloring material in aqueous inks, it is necessary to add a dispersing agent typically selected from polymeric compounds and surface active agents to produce a coloring material dispersion type aqueous ink where a water-insoluble coloring material is uniformly dispersed in an aqueous medium.

For the purpose of using such coloring material dispersion type aqueous ink for ink jet recording, attempts have been made to provide the water-insoluble coloring material in the ink with a functional feature of aggregation and that of turning into water-insoluble in order to improve the fixation and the water fastness of the ink on paper. On the other hand, as a result of providing the water-insoluble coloring material with such functional features, the dispersion stability of the water-insoluble coloring material is reduced in the ink to give rise to problems including that the water-insoluble coloring material tends to aggregate during storage to give rise to density unevenness and precipitation and that the ink is dried at the nozzle tip of an ink jet apparatus to clog the nozzle tip to reduce the ejection stability of the ink. Additionally, when printing an image, the water-insoluble coloring material can easily aggregate on the surface of the recording material so that the color saturation is remarkably degraded due to light scattered by aggregated particles to by turn degrade the color developability.

Japanese Patent Application Laid-Open No. H06-107991 proposes an ink containing polyoxyethylene alkylether to dissolve the above problems. However, the proposed ink cannot satisfactorily improve the ejection characteristics of ink.

Further features of the present invention will become apparent from the following description of exemplary embodiments with reference to the attached drawings.

SUMMARY OF THE INVENTION

In view of the above-identified problems, it is therefore an object of the present invention to provide an ink jet aqueous ink (to be also referred to simply as "ink" hereinafter) that can record high quality images with a high degree of fastness for a long period of time, an ink jet recording method that can record high quality images with a high degree of fastness, an ink cartridge containing such an ink and an ink jet recording apparatus.

The inventors of the present invention have made intensive efforts to find that the above-identified problems can be solved by the present invention. Thus, according to the present invention, there is provided an ink mainly containing a water-insoluble coloring material in an aqueous medium, containing as an auxiliary ingredient at least one ethylene oxide adduct of esters formed from sterins and hydroxyl fatty acids.

For an ink according to the present invention as defined above, it is preferable that the water-insoluble coloring material is a coloring material dispersion in which a pigment is dispersed by a polymeric dispersant or that the water-insoluble coloring material is a coloring material dispersion in which a pigment is dispersed with a polymeric dispersant and the auxiliary ingredient.

For an ink according to the present invention, it is preferable that the polymeric dispersant is comprised of at least a monomer having an anionic hydrophilic group, a monomer having an oxyethylene group and a monomer having a hydrophobic group or that the polymeric dispersant is a block copolymer comprised of a hydrophobic block comprising at least one vinyl ether and a hydrophilic block comprising at least one vinyl ether, and that the hydrophilic block of the polymeric dispersant at least contains a block comprising a vinyl ether having a nonionic hydrophilic group and a block comprising a vinyl ether having an anionic hydrophilic group.

For an ink according to the present invention, it is preferable that the polymeric dispersant is at least comprised of a block comprising a hydrophobic vinyl ether, a block comprising a hydrophilic vinyl ether having a nonionic hydrophilic group and a block comprising a hydrophilic vinyl ether having an anionic hydrophilic group, arranged in the mentioned order and that the auxiliary ingredient is at least one ethylene oxide adduct of esters formed from any one of cholesterin, lanosterin and agnosterin and a hydroxyl fatty acid, and that the ink further contains polyethylene glycol.

In another aspect of the present invention, there is also provided an ink jet recording method comprising applying an ink onto a recording medium by applying energy to the ink to cause it to fly, in which the ink is an ink according to the present invention. For an ink jet recording method according to the present invention, it is preferable that the energy is thermal energy and that the recording material is a recording material having a coating layer adapted to receive ink on at least one of the surfaces thereof.

In still another aspect of the present invention, there is provided an ink cartridge having an ink storage portion storing an ink, in which the ink is an ink according to the present invention. In still another aspect of the present invention, there is provided an ink jet recording apparatus comprising an ink cartridge having an ink storage portion storing an ink and a head portion for ejecting the ink, in which the ink is an ink according to the present invention.

Thus, according to the present invention, it is possible to provide an ink that can record high quality images with a high degree of fastness for a long period of time in any occasions, as well as to provide an ink jet recording method, an ink cartridge and an ink jet recording apparatus that can record high quality images with a high degree of fastness.

Further features of the present invention will become apparent from the following description of exemplary embodiments with reference to the attached drawings.

DESCRIPTION OF THE EMBODIMENTS

Now, the present invention will be described in greater detail.

An ink according to the present invention mainly contains a water-insoluble coloring material in an aqueous medium and is characterized by containing as an auxiliary ingredient at least one ethylene oxide adduct of esters formed from sterins and hydroxyl fatty acids (to be also referred to simple as "auxiliary ingredient" hereinafter).

Since the auxiliary ingredient that is used for the purpose of the present invention has a molecular structure that shows a good affinity for the water-insoluble coloring material in the ink and is bulky, the auxiliary ingredient and the water-insoluble coloring material are three-dimensionally closely associated. On the other hand, the oxyethylene part of the auxiliary ingredient shows a good affinity for the aqueous medium. Thus, the dispersion stability of the water-insoluble coloring material in the aqueous medium is improved to by turn improve the dispersion stability and the ejection stability of the ink. Additionally, when the ink is ejected on the surface of the recording material, the auxiliary ingredient stably remains between the surface of the recording material and the water-insoluble coloring material to anchor the coloring material, whereby improving the abrasion-resistance of a printed image. Still additionally, aggregation of particles of the water-insoluble coloring material is suppressed in the ink prepared by using the auxiliary ingredient so that the saturation of the printed image can hardly be degraded and a good color developability is achieved.

Thus, the auxiliary ingredient that is used for the purpose of the present invention appropriately suppress aggregation of particles of the water-insoluble coloring material and the oxyethylene group of the auxiliary ingredient shows a good affinity for the aqueous medium. For this reason, it is assumed that the auxiliary ingredient improves the dispersion stability of the water-insoluble coloring material in the ink and prevents degradation of the color developability of the image on the surface of the recording material.

When the coloring material is a pigment, a polymeric dispersant having an oxyethylene group is used and the oxyethylene content in the polymeric dispersant and the oxyethylene content in the auxiliary ingredient are controlled so as to be within a specific range to improve the affinity between the polymeric dispersant and the auxiliary ingredient and the dispersion stability of the water-insoluble coloring material. Furthermore, aggregation of particles of the water-insoluble coloring material is suppressed to make it possible to further improve the color developability of the image.

Because of these effects, the auxiliary ingredient to be used for the purpose of the present invention prevents degradation of the color developability of an image due to aggregation of particles of the water-insoluble coloring material on the surface of a recording material, which is a drawback of the coloring material dispersion type ink, improves the stability of the ink during a long period of time of storage and enables stable ink ejection without degradation of the dispersion stability of the water-insoluble coloring material even when the ink composition remarkably changes due to ink condensation at a nozzle tip, which always takes place when used in an ink jet apparatus. Furthermore, the auxiliary ingredient to be used for the purpose of the present invention can suppress adhesion of the water-insoluble coloring material to the peripheral part of a nozzle in an ink jet recording apparatus having a line head whose ink jet nozzle cannot be subjected to a cleaning/recovery operation frequently, so that problems such as ejection failures and print dot misalignment can hardly occur in the apparatus to make it possible to realize a good continuous printing performance for a long period of time.

(Auxiliary Ingredient)

The auxiliary ingredient to be used in an ink according to the present invention is a compound which is obtained by adding ethylene oxide to esters formed from sterins and hydroxyl fatty acids and has a structure expressed by Chemical Formula 1, 2 or 3, which will be described hereinafter. Note, however, the auxiliary ingredient to be used for the purpose of the present invention is not limited to the compounds shown below as examples.

Sterins that can most preferably be used for the purpose of the present invention include cholesterin, lanosterin and agnosterin (to be also collectively referred to as "sterins" hereinafter) and at least one of them is selected for use, although the present invention is by no means limited thereto.

The hydroxyl fatty acid comprising the auxiliary ingredient for the purpose of the present invention may be a saturated fatty acid or an unsaturated fatty acid and may be a linear fatty acid or a branched fatty acid so long as it has one or more hydroxyl groups introduced in it, although the present invention is by no limited thereto. It is particularly preferable to use fatty acids having 1 to 22 carbon atoms and having one or more hydroxyl groups introduced in it.

Specific examples of the fatty acids having 1 to 22 carbon atoms include saturated fatty acids such as methanoic acid, ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid and docosanoic acid; and unsaturated fatty acids such as methenoic acid, ethenoic acid, propenoic acid, butenoic acid, pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, heneicosenoic acid and docosenoic acid (including isomers thereof if such isomers exist), although the present invention is by no means limited thereto.

Particularly, of the hydroxyl fatty acids, lanopalmitic acid obtained by introducing hydroxyl groups into hexadecanoic acid (palmitic acid) having sixteen carbon atoms is preferable. From above, the compounds having structures expressed by Formulas 1, 2 and 3 below are preferably used as the auxiliary ingredient for the purpose of the present invention.

Formula 1

Formula 2

Formula 3

In the above formulas, n is a number of 10 to 100, preferably 10 to 60. The values of the ranges are average values because the numbers of polyoxyethylene groups in the auxiliary ingredient to be used for the purpose of the present invention are not uniform. The affinity between the auxiliary ingredient and the ink medium is reduced so that the stability of the water-insoluble coloring material in the ink may be degraded when n is less than 10, whereas the affinity between the auxiliary ingredient and the water-insoluble coloring material is reduced so that the color developability of a printed image may be degraded when n exceeds 100.

While a commercially available compound may be used for the auxiliary ingredient, the auxiliary ingredient is preferably prepared by adding ethylene oxide to esters formed from sterins and lanopalmitic acid in the presence of a basic catalyst by means of an ordinary method such as a gas phase method and a liquid phase method. The number of ethylene oxides in the auxiliary ingredient can be identified qualitatively and quantitatively by means of NMR or IR or by means of analysis using any of various chromatography methods. One of the compounds that can be used for the auxiliary ingredient may be used alone or two or more compounds may be combined for use for the purpose of the present invention. The content of the auxiliary ingredient in the ink is preferably within the range between 0.1 and 5.0 mass %, more preferably within the range between 0.2 and 2.0 mass %.

(Water-Insoluble Coloring Material)

Any coloring material that scarcely dissolves in water can be used for the water-insoluble coloring material of an ink according to the present invention. More specifically, coloring materials that can be used for the purpose of the present invention are those having a solubility relative to water of preferably not greater than 0.5 mass %, more preferably not greater than 0.1 mass %. Examples of such coloring materials include oil-soluble dyes, vat dyes, disperse dyes and pigments, of which pigments are preferable. Specific examples of the water-insoluble coloring materials are listed below, although the present invention is by no means limited thereto.

(Oil-Soluble Dyes)

C. I. Solvent Yellow 1, 2, 3, 13, 14, 19, 21, 22, 29, 36, 37, 38, 39, 40, 42, 43, 44, 45, 47, 62, 63, 71, 76, 79, 81, 82, 83:1, 85, 86, 88, 151; C. I. Solvent Red 8, 27, 35, 36, 37, 38, 39, 40, 49, 58, 60, 65, 69, 81, 83:1, 86, 89, 91, 92, 97, 99, 100, 109, 118, 119, 122, 127, 218; C. I. Solvent Blue 14, 24, 25, 26, 34, 37, 38, 39, 42, 43, 44, 45, 48, 52, 53, 55, 59, 67, 70; C. I. Solvent Black 3, 5, 7, 8, 14, 17, 19, 20, 22, 24, 26, 27, 28, 29, 43, 45, etc.

(Vat Dyes)

C. I. Vat Yellow 2, 4, 10, 20, 33; C. I. Vat Orange 1, 2, 3, 5, 7, 9, 13, 15; C. I. Vat Red 1, 2, 10, 13, 15, 16, 61; C. I. Vat Blue 1, 3, 4, 5, 6, 8, 12, 14, 18, 19, 20, 29, 35, 41; C. I. Vat Black 1, 8, 9, 13, 14, 20, 25, 27, 29, 36, 56, 57, 59, 60, etc.

(Disperse Dyes)

C. I. Disperse Yellow 5, 42, 83, 93, 99, 198, 224; C. I. Disperse Orange 29, 49, 73; C. I, Disperse Red 92, 126, 145, 152, 159, 177, 181, 206, 283; C. I. Disperse Blue 60, 87, 128, 154, 201, 214, 224, 257, 287, 368, etc.

(Pigments)

Raven 760 Ultra, Raven 1060 Ultra, Raven 1080, Raven 1100 Ultra, Raven 1170, Raven 1200, Raven 1250, Raven 1255, Raven 1500, Raven 2000, Raven 2500 Ultra, Raven 3500, Raven 5250, Raven 5750, Raven 7000, Raven 5000 ULTRAII, Raven 1190 ULTRAII (available from Columbian Carbon Co., Ltd.); Black Pearls L, MOGUL-L, Regal400R, Regal660R, Regal330R, Monarch 800, Monarch 880, Monarch 900, Monarch 1000, Monarch 1300, Monarch 1400 (available from Cabot Co.);

Color Black FW1, Color Black FW2, Color Black FW200, Color Black 18, Color Black S160, Color Black S170, Special Black 4, Special Black 4A, Special Black 6, Special Black 550, Printex 35, Printex 45, Printex 55, Printex 85, Printex 95, Printex U, Printex 140U, Printex V, Printex 140V (available from Degussa Co.); No. 25, No. 33, No. 40, No. 45, No. 47, No. 52, No. 900, No. 970, No. 2200B, No. 2300, No. 2400B, MCF-88, MA600, MA77, MA8, MA100, MA230, MA220 (available from Mitsubishi Chemical Corporation).

C. I. Pigment Yellow 3, 12, 13, 14, 17, 20, 24, 74, 83, 86, 93, 95, 97, 109, 110, 117, 120, 125, 128, 137, 138, 147, 148, 150, 151, 153, 154, 166, 168, 175, 180, 183, 184, 185; C. I. Pigment Orange 16, 36, 43, 51, 55, 59, 61, 71; C. I. Pigment Red 9, 12, 48, 49, 52, 53, 57, 97, 122, 123, 149, 168, 175, 176, 177, 180, 184, 192, 202, 215, 216, 217, 220, 223, 224, 226, 227, 228, 238, 240, 254, 255, 272; C. I, Pigment Violet 19, 23, 29, 30, 32, 37, 40, 50; C. I. Pigment Blue 15, 15:1, 15:2, 15:3, 15:4, 15:6, 16, 22, 60, 64; C. I. Pigment Green 7, 36; C. I. Pigment Brown 23, 25, 26; C. I. Pigment Black 1, 10, 31, 32, etc.

The content of the water-insoluble coloring material in an ink according to the present invention is preferably within the range between 0.1 and 20.0 mass %, more preferably between 1.0 and 10.0 mass %, relative to the total mass of the ink. A satisfactory image density may not be obtained when the content of the water-insoluble coloring material is less than 0.1 mass %, whereas a reduced ejection stability of ink due to a clogged nozzle may take place when the content of the water-insoluble coloring material exceeds 20.0 mass %. For the purpose of the present invention, any of the above-cited water-insoluble coloring materials can be used alone or in combination o two or more of them.

The water-insoluble coloring material to be used in an ink according to the present invention needs to be uniformly dispersed in the ink. Since the water-insoluble coloring material to be used for the purpose of the present invention is a coloring material that scarcely dissolves in water by itself, it has to be dispersed in an ink medium. Techniques that can be used for dispersing a water-insoluble coloring material in an ink medium include a technique of imparting a hydrophilic group to the surface of the coloring material so as to make the coloring material disperse in the ink medium by itself and a technique of dispersing it by using a polymeric dispersant. Particularly preferably, a pigment is used as a water-insoluble coloring material and dispersed by means of a polymeric dispersant, because the color developability of a printed image can be further improved.

Any techniques including those that are known and those that are newly invented may be used to introduce a hydrophilic group to the surface of the coloring material. Such known techniques include oxidation processes using an oxidizing agent (e.g., nitric acid, permanganates, dichromates, hypochlorites, ammonium persulfate, hydrogen peroxide, ozone, etc.), processes using a coupling agent such as a silane compound, and plasma processes. A newly developed technique may also be used for the purpose of the present invention. Any of the above listed techniques may be combined for use.

As a technique for dispersing a water-insoluble coloring material (pigment) by means of a polymeric dispersant, the water-insoluble coloring material and the polymeric dispersant are kneaded, added to a predetermined liquid medium and dispersed therein followed by addition of water for dilution as well as various additives. A kneader or a roll mill may be used for kneading a water-insoluble coloring material and a polymeric dispersant, and the kneaded mixture may be dispersed by applying ultrasonic waves or by using a disperser such as a beads mill or a ball mill.

(Polymeric Dispersant)

As the polymeric dispersant preferably used for the purpose of the present invention, any polymeric compound having both a hydrophilic unit and a hydrophobic unit and operating as a dispersant for a water-insoluble coloring material can be used. More preferably, a polymeric compound formed from a monomer having an anionic hydrophilic group, a monomer having an oxyethylene group and a monomer having a hydrophobic group may be preferably used for the purpose of the present invention.

When the polymeric dispersant has an oxyethylene group, the ratio of the number of oxyethylene units (A) in the auxiliary ingredient relative to the number of oxyethylene units (B) in the polymeric dispersant is preferably in the range of A/B=0.02 to 5.00, more preferably in the range of A/B=0.05 to 3.00, because the affinity between the polymeric dispersant and the auxiliary ingredient is improved with such a ratio. The dispersion stability of the water-insoluble coloring material is apt to be reduced when the ratio of the number of oxyethylene units in the auxiliary ingredient relative to the number of oxyethylene units in the polymeric dispersant is less than 0.02, whereas the printed image can be degraded when the ratio exceeds 5.00. The expression of the number of oxyethylene units in the auxiliary ingredient and the number of oxyethylene units in the polymeric dispersant respectively refers to the number of oxyethylene units in one molecule of the auxiliary ingredient and the number of oxyethylene units in one molecule of the polymeric dispersant.

Polymeric dispersants as described above may be polymeric compounds obtained by polymerizing vinyl type monomers. Examples of such polymeric compounds include those obtained by copolymerizing at least one hydrophobic monomer selected from various esters including acrylic ester, methacrylic ester, crotonic acid ester, itaconic acid ester, maleic acid ester and fumaric acid ester having an alkyl group or a phenyl group as the hydrophobic group of, for example, octylmethacrylate, dodecylacrylate and benzylmethacrylate; an nonionic hydrophilic monomer having an oxyethylene group such as triethyleneglycolmonomethylethermethacrylate and polyethyleneglycolmonoethyletheracrylate; and a monomer having an acidic group such as acrylic acid, methacrylic acid, crotonic acid, itaconic acid, maleic acid and fumaric acid.

Above all, a block copolymer comprised of a hydrophobic block comprising at least one vinylether and a hydrophilic block comprising at least one vinylether is desirable as a polymeric dispersant for the purpose of the present invention because such a polymeric dispersant shows an excellent affinity for the auxiliary ingredient in view of a good color developability and good dispersion stability of water-insoluble coloring material. Particularly preferably, the hydrophilic block of the polymeric dispersant at least includes a block comprising a vinylether having at least a nonionic hydrophilic group of an oxyethylene group, and a block comprising a vinylether having an anionic hydrophilic group. When the polymeric dispersant is at least comprised of a block comprising a hydrophobic vinyl ether, a block comprising a hydrophilic vinyl ether having a nonionic hydrophilic group having an oxyethylene group, and a block comprising a hydrophilic vinyl ether having an anionic hydrophilic group, arranged in the mentioned order, its affinity for the auxiliary ingredient is further improved so that the use of such a polymeric dispersant is preferable.

The polymeric dispersant that is preferably used for the purpose of the present invention typically has a repeating unit structure expressed by the general formula (1) shown below.

$$\text{—(CH}_2\text{—CH(OR}^1\text{))} \tag{1}$$

For the block having a hydrophobic block, $R^1$ in the above general formula represents an aliphatic hydrocarbon group such as an alkyl group, an alkenyl group and a cycloalkyl group, or an aromatic hydrocarbon group where a carbon atom thereof may be substituted by a nitrogen atom such as a phenyl group, a pyridyl group, a benzyl group, a toluyl group, xylyl group, an alkylphyenyl group, a phenylalkylene group, a biphenyl group and a phenypyridyl group. A hydrogen atom on the aromatic ring may be substituted by a hydrocarbon group. The number of carbon atoms of $R^1$ is preferably 1 to 18.

$R^1$ may be a group expressed by $\text{—(CH}_2)_m\text{—(O)}_n R^4$, where $R^4$ represents an aliphatic hydrocarbon group such as an alkyl group, an alkenyl group, a cycloalkyl group, and a cycloalkenyl group; or an aromatic hydrocarbon group where a carbon atom thereof may be replaced by a nitrogen atom (a hydrogen atom on the aromatic ring may be substituted by a hydrocarbon group) such as a phenyl group, a pyridyl group, a benzyl group, a toluyl group, a xylyl group, an alkylphenyl group, a phenylalkylene group, a biphenyl group and a phe- nylpyridyl group; or —CHO, —CH₂CHO, —CO—CH=CH₂, —CO—C (CH₃)=CH₂, —CH₂—CH=CH₂, —CH₂—C (CH₃)=CH₂ or —CH₂—COOR⁵. In any of the above listed groups, a hydrogen atom thereof may be substituted by a halogen atom such as a fluorine atom, a chlorine atom and a bromine atom so long as such a substitution is chemically feasible. The number of carbon atoms of R⁴ is preferably 1 to 18. In the above formula, m is preferably 3 to 36 and n is preferably 0 or 1. In the above formulas R⁵ is the same as R⁴.

The block comprising a vinylether having a nonionic hydrophilic group of an oxyethylene group is a unit of the above formula (1) where R¹ is expressed by —(CH(R²)—CH(R³)—O)$_p$—R⁴, where each of R² and R³ independently represents a hydrogen atom or a methyl group and R⁴ represents, as above, an aliphatic hydrocarbon group such as an alkyl group, an alkenyl group, a cycloalkyl group, and a cycloalkenyl group; an aromatic hydrocarbon group where a carbon atom thereof may be replaced by a nitrogen atom (a hydrogen atom on the aromatic ring may be substituted by a hydrocarbon group), such as a phenyl group, a pyridyl group, a benzyl group, a toluyl group, a xylyl group, an alkylphenyl group, a phenylalkylene group, a biphenyl group and a phenylpyridyl group; or —CHO, —CH₂CHO, —CO—CH=CH₂, —Co—C(CH₃)=CH₂, —CH₂—CH=CH₂, —CH₂—C(CH₃)=CH₂ or —CH₂—COOR⁵. In any the above listed groups, a hydrogen atom thereof may be substituted by a halogen atom such as a fluorine atom, a chlorine atom and a bromine atom so long as such a substitution is chemically feasible. The number of carbon atoms of R⁴ is preferably 1 to 18. In the above formula, p is preferably 1 to 18. In the above formulas R⁵ is the same as R⁴.

The alkyl or alkenyl group in R¹ and R⁴ of the above formula may be a methyl group, an ethyl group, a propyl group, an isopropyl group, an n-butyl group, a sec-butyl group, a t-butyl group, a pentyl group, a hexyl group, a heptyl group, an octyl group, a nonyl group, a decyl group, a dodecyl group, a tetradecyl group, a hexadecyl group, an octadecyl group, an oleyl group or a linoleyl group. The cycloalkyl or cycloalkenyl group may be a cyclopropyl group, a cyclobutyl group, a cyclopentyl group a cyclohexyl group, a cyclooctyl group or cyclohexenyl group.

The block comprising a vinylether having an anionic hydrophilic group is a unit of the above formula (1) where R¹ is expressed by —CH₂CH₂CH$_{OCH2}$COOH, —CH₂CH₂COOH, —CH₂COOH or —(CH(R²)—CH(R³)—O)$_p$—R⁵—COOH, where each of R² and R³ independently represents a hydrogen atom or a methyl group and R⁵ represents a methylene group, an ethylene group or a phenylene group. In the above formula, p is preferably 1 to 18.

Now, examples of structures of vinylether monomers (I-a through I-o) that can be used to constitute a polymeric dispersant for the purpose of the present invention and those of polymeric dispersants (II-a through II-e) are listed below, although the polyvinylether structures of the polymeric dispersants used in the present invention are not limited thereto.

(I-a)

(I-b)

(I-c)

-continued

(I-d)

(I-e)

(I-f)

(I-g)

(I-h)

(I-i)

(I-j)

(I-k)

(I-l)

(I-m)

(I-n)

(I-o)

(II-a)

(II-b)

-continued (II-c)

(II-d)

(II-e)

In the repeating units of the above listed polyvinylethers ((II-a) through (II-e) listed above), each of l, m and n is preferably independently 1 to 10,000. The total of them, or l+m+n, in the above formulas ((II-a) through (II-e)) is preferably 10 to 20,000. The average molecular weight is preferably 500 to 20,000,000, more preferably 1,000 to 5,000,000, most preferably 2,000 to 2,000,000.

The content proportion of the polymeric dispersant in the ink is preferably between 0.1 and 20.0 mass %, more preferably between 0.5 and 10.0 mass % relative to the total mass of the ink. The content ratio of the water-insoluble coloring material relative to the polymeric dispersant in the ink is preferably 100:1 to 1:2 in terms of solid content mass ratio from the viewpoint of ejection stability and storage stability of ink. In the case where the polymeric dispersant has oxyethylene groups, the affinity between the polymeric dispersant and the auxiliary ingredient is further improved and hence the fixability and the color developability of the ink on the surface of the recording material are further improved. when the ratio of the total number of units of oxyethylene (a) of the auxiliary ingredient relative to the total number of units of oxyethylene (b) of the polymeric dispersant in the ink is within the range of a/b=0.02 to 26.00, preferably 0.50 to 15.00. The expression of the total number of units refers to the total number of units of oxyethylene as computationally determined from the used amount of each of the auxiliary ingredient and the polymeric dispersant. More specifically, the total number of units is expressed by the product of the number of units of oxyethylene in one molecule and the number of moles of the molecules in the ink (used amount/molecular weight).

While there is no limitation to a method of synthesizing the copolymer having a vinylether type polymer block (polymeric dispersant), the technique of cation living polymerization proposed by Aoshima et al. (Japanese Patent Application Laid-Open No. H11-322942, Japanese Patent Application Laid-Open No. H11-322866) may advantageously be used for the purpose of the present invention. It is possible to synthesize homopolymers with an accurately uniformized length (molecular weight) through cationic living polymerization as well as various copolymers including copolymers formed from two or more component monomers, block copolymers, graft copolymers and gradation copolymers. It is possible to introduce various functional groups to the side chains of polyvinylether.

As neutralizer for the anionic hydrophilic groups of the polymeric dispersant, any neutralizer that can neutralize the anionic hydrophilic groups in the polymeric dispersant and is soluble in water can be used for the purpose of the present invention. Examples of neutralizers that can be used for the purpose of the present invention include hydroxides of alkali metals such as lithium, sodium and potassium, amines such as monoethanol amine and triethanol amine, and ammonium, of which lithium hydroxide or sodium hydroxide is preferable because the stability of a water-insoluble coloring material to be obtained is further improved.

(Water-Soluble Organic Solvent)

Any water-soluble organic solvent can be used for an ink according to the present invention. A mixture solvent of two or more different water-soluble organic solvents can also be used for the purpose of the present invention.

Specific examples of preferable water-soluble organic solvents include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol and 1,4-cyclohexanediol; triols such as glycerin, 1,2,4-butanetriol, 1,2,6-hexanetriol and 1,2,5-pentanetriol; hindered alcohols such as trimethylolpropane, trimethylolethane, neopentyl glycol and pentaerythritol; glycol ethers such as ethyleneglycolmonomethylether, ethyleneglycolmonoethylether, ethyleneglycolmonoisopropylether, ethyleneglycolmonoallylether, diethyleneglycolmonomethylether, diethyleneglycolmonoethylether, diethyleneglycolmonobutylether, triethyleneglycolmonomethylether, triethyleneglycolmonoethylether, propyleneglycolmonomethylether and dipropyleneglycolmonomethylether; dimethylsulfoxide, glycerinmonoallylether, N-methyl-2-pyrrolidone, 2-pyrrolidone, γ-butyrolactone, 1,3-dimethyl-2-imidazolidinone, sulforan, β-dihydroxyethylurea, acetonylacetone, dimethyl formamide, dimethyl acetamide, acetone, diacetonealcohol, tetrahydrofuran, and dioxane.

Of the above listed water-soluble organic solvents, those having a boiling point not lower than 120° C. are preferable because they can suppress condensation of ink at a nozzle tip. The content proportion of the water-soluble organic solvent in the ink is preferably between 5 and 50 mass %, more preferably between 10 and 30 mass % relative to the total mass of the ink.

While the indispensable ingredients of an ink according to the present invention are listed above, various auxiliary ingredients such as a surface active agent, a pH regulating agent, an antioxidant and/or an anti-mold agent may be added. Particularly, it is highly preferable to add polyethylene glycol in addition to the above-described auxiliary ingredient because the dispersion stability of the coloring material and the ejection stability of the ink are further improved. For the purpose of the present invention, the use of a polyethylene glycol with the number of units of oxyethylene between 10 and 35 is preferable. Additionally, the ratio of the number of units of oxyethylene (C) of polyethylene glycol relative to the number of units of oxyethylene (A) in the above-described auxiliary ingredient used in the present invention is preferably within the range of C/A=0.1 to 2.5, because the dispersion stability of the coloring material and the ejection stability of the ink are improved during a long period of time of storage.

The content proportion of polyethylene glycol in an ink according to the present invention is preferably between 0.5 and 10.0 mass %, more preferably between 1 and 5 mass %, relative to the total mass of the ink. Particularly, the ratio of the total number of units of oxyethylene (c) in the polyethylene glycol contained in the ink relative to the total number of units of oxyethylene (a) in the auxiliary ingredient is preferably within the range of c/a=1 to 20, because the dispersion stability of the coloring material and the ejection stability of ink are improved during a long period of time of storage.

An ink jet recording method according to the present invention in which energy is applied to an ink to cause the ink to fly is characterized in that it employs an aqueous ink according to the present invention. While energy may be thermal energy or mechanical energy, the use of thermal energy is preferable.

While any recording material may be used for an ink jet recording method according to the present invention, a recording material having a coating layer adapted to receive ink on at least one of the surfaces thereof is preferable for the purpose of the present invention. Such a recording material includes recording sheets for ink jet recording, sheets for post cards and name cards, sheets for labels, sheets of cardboard and films for ink jet recording. More specifically, a recording material having a coating layer adapted to receive ink on at least one of the surfaces thereof that contains at least a hydrophilic polymer and/or an inorganic porous material is preferable.

An ink jet recording apparatus for recording an image by using an aqueous ink according to the present invention may be a home use printer that mainly employs A4 size sheets, a printer for printing name cards and other cards or a large business printer. An ink jet recording apparatus that can suitably be used with an aqueous ink according to the present invention will be described below.

(Ink Jet Recording Apparatus Utilizing Thermal Energy)

Figure 1:
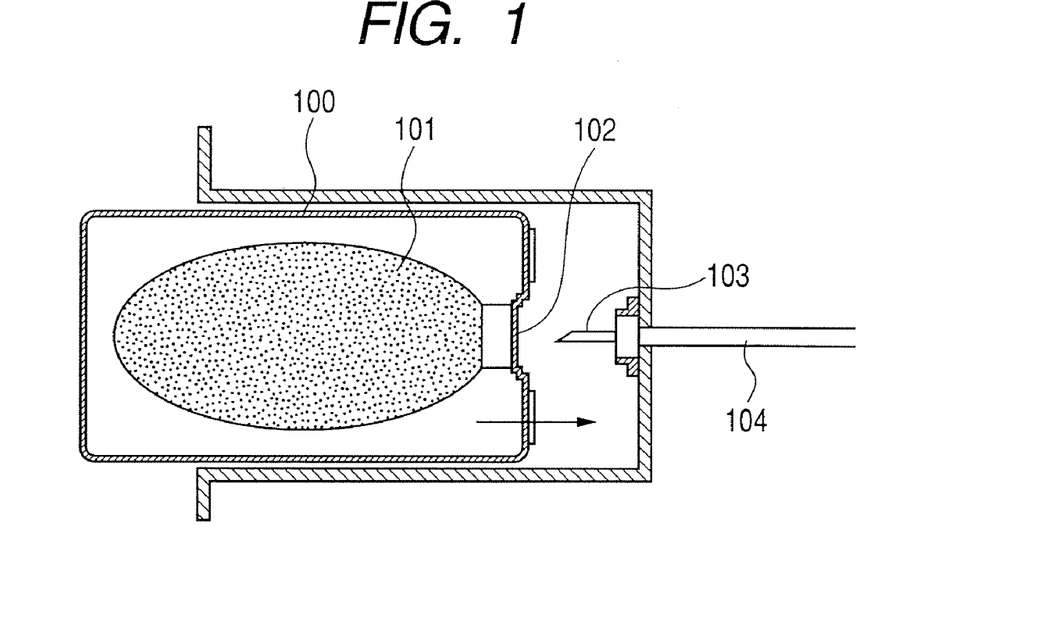
FIG. 1 is a schematic illustration of an ink cartridge according to the present invention, showing the structure thereof.

FIG. 1 is a schematic illustration of an embodiment of an ink cartridge 100 according to the present invention that contains ink to be supplied to a recording head by way of an ink supply tube 104, showing the structure thereof. In FIG. 1, reference symbol 101 denotes an ink bag containing ink to be supplied and a stopper 102 that is made of a butyl chloride rubber is arranged at the front end thereof. As a needle 103 is driven into the stopper 102, the ink in the ink bag 101 is supplied to the recording head shown in FIG. 3 (heads 303 through 306). The ink cartridge may be provided with an ink absorbent for receiving waste ink. An ink recording apparatus according to the present invention may be one in which the ink cartridge is provided separately from the recording head and may also be one in which they are integrally provided.

Figure 2:
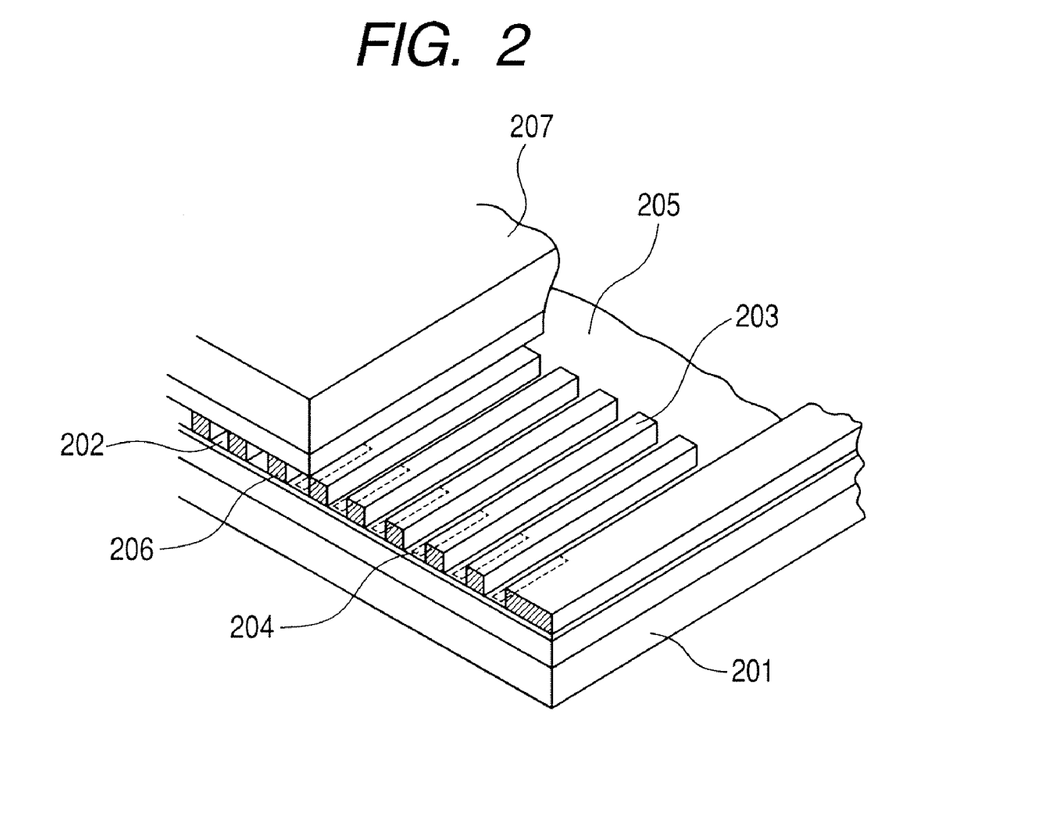
FIG. 2 is a schematic illustration of an ink jet recording head that can be used for the purpose of the present invention, showing the structure thereof.

FIG. 2 is a schematic illustration of an ink jet recording head to be used in this embodiment. The head comprises nozzles 202, each of which is provided with a heat generating body 204 (heater) to generate heat and then generate bubbles when a predetermined drive pulse is applied thereto from a recording head drive circuit. Then ink droplets are ejected from the ejection orifice 202 under the effect of bubbles. The heaters 204 are formed on a silicone substrate 206 by means of a technique similar to a semiconductor manufacturing process. In FIG. 2, reference symbol 203 denotes a nozzle bulkhead that defines the nozzle 202. and reference symbol 205 denotes a common liquid chamber for supplying ink to the nozzles 202, whereas reference symbol 207 denotes a top plate and reference symbol 201 denotes a base plate.

Figure 3:
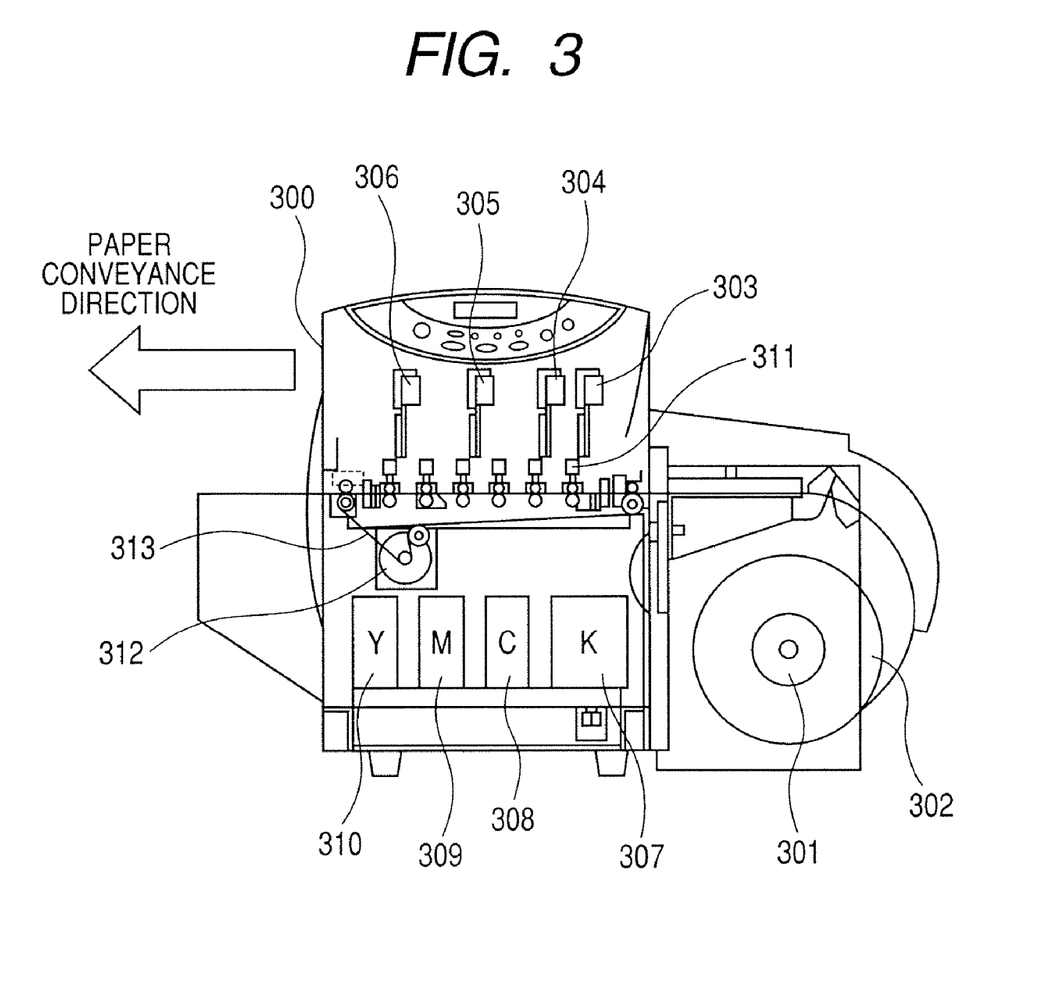
FIG. 3 is a schematic see-through view of an ink jet recording apparatus according to the present invention.

FIG. 3 is a schematic partial see-through view of an embodiment of ink jet recording apparatus according to the present invention. A recording material 302 is supplied to a recording apparatus 300 typically from a roll supply unit 301 and conveyed continuously by way of a conveyer unit with which the main body of the recording apparatus 300 is provided. The conveyer unit comprises a conveyer motor 312, a conveyer belt 313 and so on. For recording an image, a black recording head 303 starts ejecting a black ink when the image cutout position of the recording material passes under the recording head 303. Then, a cyan recording head 304, a magenta recording head 305 and a yellow recording head 306 sequentially eject respective inks to form a color image.

The recording apparatus 300 additionally comprises a cap mechanism 311 for capping the recording heads during a standby status, ink cartridges 307 through 310 for supplying inks to the respective recording heads 303 through 306, a pump unit (not shown) for supplying inks and performing recovery operations and a control substrate (not shown) for controlling the entire recording apparatus.

Figure 4:
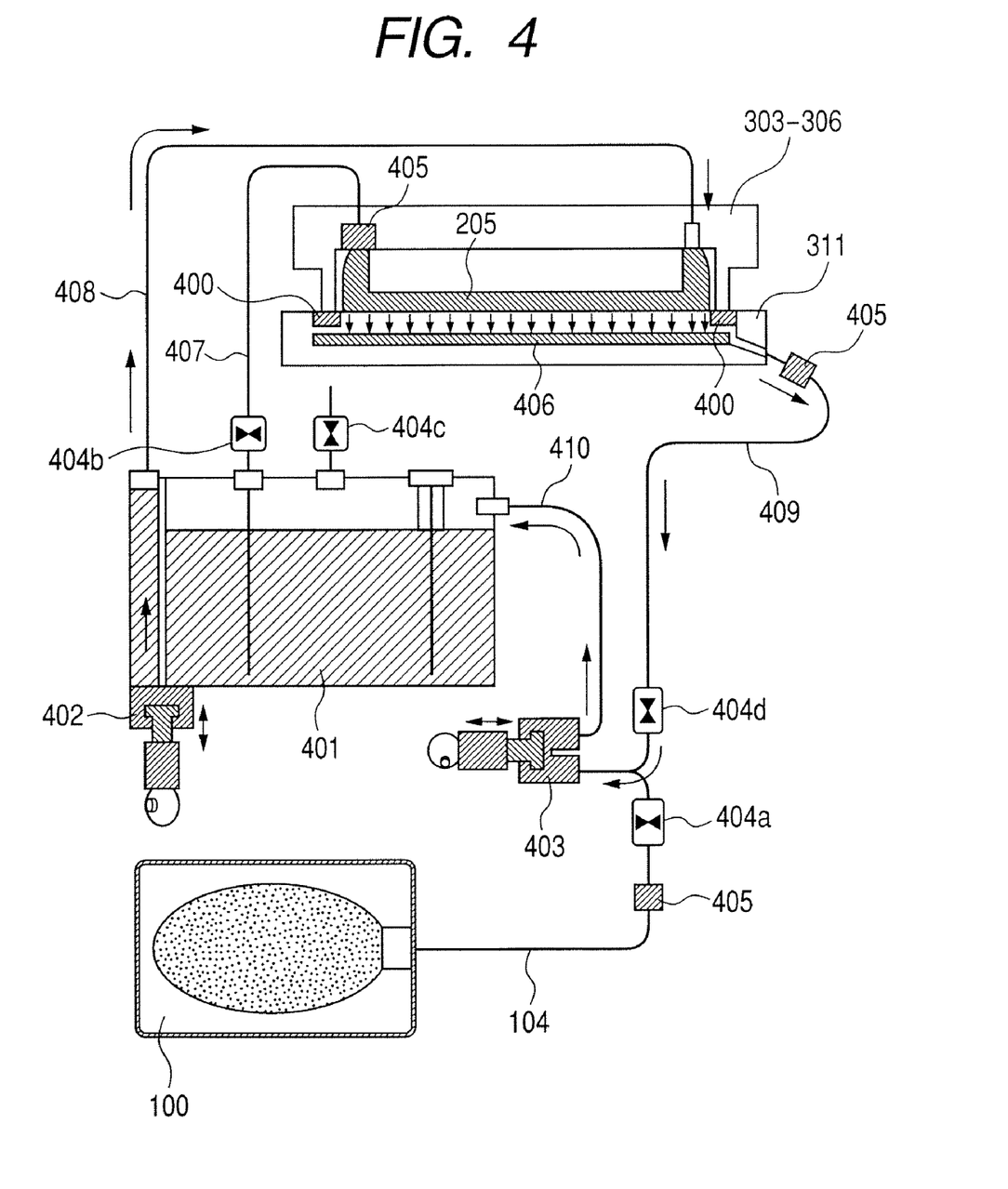
FIG. 4 is a schematic illustration of the recovery processing system of an ink jet recording apparatus of the present invention.

FIG. 4 is a schematic illustration of a recovery processing system of the ink jet recording apparatus according to this embodiment. Referring to FIG. 4, when each of the recording heads 303 through 306 is lowered, the system can perform a predetermined recovery operation when the surfaces forming the ink ejection orifices are brought in proximity to the respective caps 400 that are made of a butyl chloride rubber and arranged in the cap mechanism 311.

The recovery processing system comprises an ink recycling circuit section that includes as principal components thereof, an ink cartridge 100 storing an ink to be refilled in a polyethylene bag, a sub-tank 401 to be connected by way of a suction pump 403, which suction pump 403 is adapted to collect in the sub-tank 401 the ink from the cap mechanism 311 and is arranged on an ink supply channel 409 made of vinyl chloride to connect the cap 400 and the sub-tank 401, a filter 405 for removing contaminants in the ink collected from the cap, a pressurizing pump 402 for supplying inks to the common liquid chambers of the recording heads 303 through 306, an ink supply channel 407 for supplying the ink returned from the recording head to the sub-tank 401 and valves 404a through 404d.

In an operation of cleaning the recording heads 303 through 306, the recovery valve 404b is closed and the pressurizing pump 402 is operated to apply pressure and supply ink from the sub-tank 401 to the recording head, thereby forcibly discharging it from the nozzle 406. As a result of this operation, the bubbles, the ink and the contaminants in the nozzle of the recording head are discharged. The suction pump 403 causes the sub-tank 401 to collect the ink discharged from the recording head into the cap mechanism 311 by way of an ink supply channel 410.

(Ink Jet Recording Apparatus Utilizing Mechanical Energy)

Figure 5:
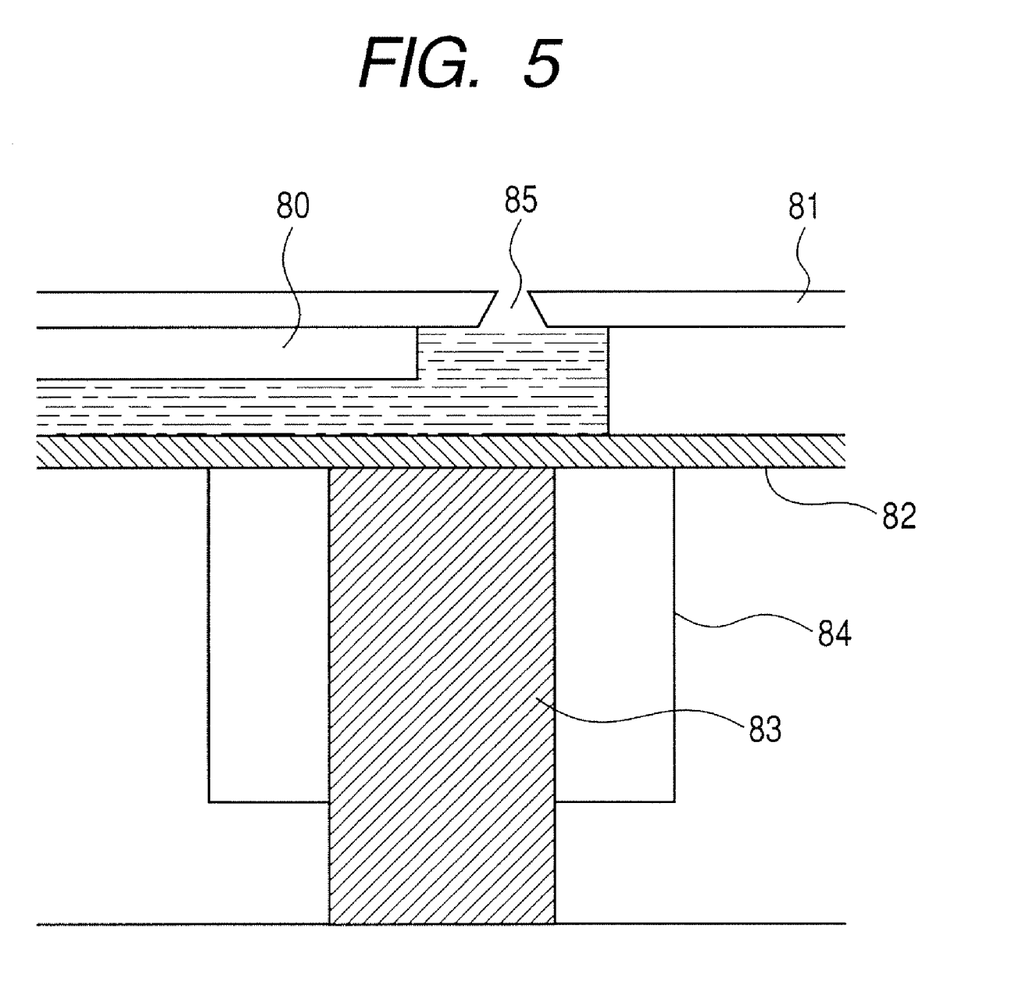
FIG. 5 is a schematic cross sectional view of another ink jet recording head that can be used for the purpose of the present invention, showing the configuration thereof.

An on-demand type ink jet recording head that can suitably be used for the above embodiment of the ink jet recording apparatus utilizing mechanical energy comprises a nozzle forming substrate having a plurality of nozzles, a pressure generating element arranged opposite to the nozzles and made of a piezoelectric material and an electrically conductive material, and an ink filled around the pressure generating element. The pressure generating element is displaced by applying a voltage so that fine droplets of the ink are ejected from the head. FIG. 5 shows the configuration of the recording head that is a principal part of the recording apparatus.

The head has an ink flow channel 80 communicating with an ink chamber (not shown), an orifice plate 81 for allowing a desired volume of ink to be ejected, a vibration plate 82 for directly applying pressure to ink, a piezoelectric element 83 bonded to the vibration plate 82 and adapted to be displaced according to an electric signal, and a substrate 84 for supporting and fixing the orifice plate 81, the vibration plate 82 and so on.

Referring to FIG. 5, the ink flow channel 80 is typically made of a photosensitive resin, the orifice plate 81 is made of a metal such as stainless steel or nickel and provided with an ejection orifice 85 that is formed by way of electric die casting or press working, the vibration plate 82 is typically made of a metal film of stainless steel, nickel or titanium and a highly elastic resin film, and the piezoelectric element 83 is made of a dielectric material such as barium titanate or PZT. The recording head having the above described configuration conducts recording operation in such a way that applying a pulse-shaped voltage to the piezoelectric element 83 generates strain stress, and then energy thereof causes the vibration plate 82 bonded to the piezoelectric element 83 to deform to perpendicularly apply pressure to the ink in the inside of the ink flow channel 80, thereby ejecting ink droplets from the ejection port 85 of the orifice plate 81.

EXAMPLES

Now, the present invention will be described in greater detail by way of examples, although the present invention is by no means limited to those examples. In the following, "parts" and "%" are respectively "parts by mass" and "mass %" unless noted otherwise. To identify a polymer dispersion, a nuclear magnetic resonance absorption measuring instrument (NMR, ECA400: available from JEOL Ltd., using tetrahydrofuran-d8 as a solvent), GPC (HLC8220: available from Tohso Co., Ltd., columns: TSK-GEL4000HXL, TSK-GEL3000HXL and TSK-GEL2000HXL, column oven temperature: 40.0° C.), an IR absorption measuring instrument (FT/IR5300: available from JASCO Corporation, a film was formed on a potassium bromide plate for measurement), GC/MS (HP6890: available from Hewlett-Packard, using capillary columns) were used.

(Synthesis Of Auxiliary Ingredient)

136.2 parts (0.5 mol) of commercially available lanopalmitic acid (16-hydroxy hexadecaoic acid: available from Aldrich Co.) was added to an aqueous solution of dimethyl sulfate-concentrated sodium hydroxide to methylate the hydroxyl group, and subsequently 193.3b parts (0.5 mol) of commercially available cholesterin (Cholesterol: available from Aldrich Co.) was made to act on the obtained methylation product to conduct ester condensation in DMF in the presence of sulfuric acid. After confirming the completion of the reaction, the reaction product was demethylated by way of an ordinary process, using boron trichloride, to obtain cholesterin lanopalmitate. The obtained lanopalmitic acid ester of cholesterin was identified by means of analysis using NMR spectrometry, IR spectrometry, gas chromatography and GPC.

64.1 parts (0.1 mol) of the above described lanopalmitic acid ester of cholesterin and sodium-tert-butoxide as a reaction catalyst were put into an autoclave having a capacity of 200 ml and equipped with an agitation unit and a pressure gauge, ethylene oxide under cooling with dry ice was added thereto in an amount listed in Table 1. Then, the autoclave was hermetically sealed and the contents was mixed well by means of the agitation unit. Thereafter, the autoclave was heated to 135° C., while agitating the contents, until the internal pressure of the autoclave fell to a stable level. Subsequently, the autoclave was cooled and the reaction product was neutralized by adding acetic acid and then the impurity was removed by filtration and distillation. In this way, the compounds a through h as listed in Table 1 were obtained as an ethylene oxide adduct of a lanopalmitic acid ester of cholesterin (auxiliary ingredient). The added amounts of ethylene oxide and the number of units of oxyethylene are shown in Table 1. The obtained ethylene oxide adducts of lanopalmitic acid esters of cholesterin were then identified by means of NMR spectrometry, IR spectrometry, gas chromatography and GPC.

TABLE 1

| auxiliary ingredient | number of EO * | added amounts of ethylene oxide | |
|---|---|---|---|
| | | parts by mass | mol |
| compound a | 10 | 44.0 | 1.0 |
| compound b | 10 | 44.0 | 1.0 |
| compound c | 100 | 440.0 | 10.0 |
| compound d | 20 | 88.0 | 2.0 |
| compound e | 20 | 88.0 | 2.0 |
| compound f | 40 | 176.0 | 4.0 |
| compound g | 60 | 264.0 | 6.0 |
| compound h | 60 | 264.0 | 6.0 |

* The number of EO is the number of units of ethylene oxide added to the auxiliary ingredient.

Example 1

Preparation Of Coloring Material Dispersion I

After mixing 300 g of commercially available acidic carbon black "Monarch 1300" (available from Cabot Co.) showing a pH value of 2.5 with 1,000 milliliters of water and then 450 g of sodium hypochlorite was dropped into the mixture. Then, the mixture was agitated at 100 to 110° C. for eight hours. The obtained slurry was ten-times diluted with water and the pH value was adjusted by lithium hydroxide. Then, the diluted slurry was desalted and condensed by means of an ultra filtration film to a conductivity of 0.2 mS/cm to produce a black coloring material dispersion with a pigment concentration of 10%. The obtained coloring material was subjected to a centrifugal process and filtered by means of a 3 μm nylon filter to remove large particles to obtain a final black coloring material dispersion. The zeta potential of the obtained coloring material dispersion was −60 mV when measured by means of an electrophoretic light scattering method (using a laser electrometer ESL-6000: available from Ohtsuka Electronics Co. Ltd.).

(Preparation Of Ink 1)

| | |
|---|---|
| coloring material dispersion I | 50.0 parts |
| compound a (number of oxyethylene units: 10) | 5.0 parts |
| glycerin | 5.0 parts |
| diethylene glycol | 10.0 parts |

| isopropyl alcohol | 3.0 parts |
| ion exchanged water | 27.0 parts |

The above listed ingredients were mixed thoroughly and filtered by means of a micro-filter with a pore diameter of 3 μm to obtain the target ink.

Example 2

Preparation Of Polymeric Dispersant A 300 parts of methyl ethyl ketone was put into a 4-mouthed glass-made flask equipped with a reflux tube, a dropping funnel, a thermometer and an agitation unit and heated until refluxing took place steadily from the reflux tube, while agitating the solution. The internal temperature was 84° C. A mixture solution of 10 parts of tert-octyl methacrylate, 44 parts of 2-(2-(2-(2-hydroxyethoxy) ethoxy)ethoxy)ethylvinylether, 10 parts of methacrylic acid and 4 parts of a polymerization initiator (ABN-E: available from Wako Pure Chemical Industries, Ltd.) was dropped at a constant rate over 180 minutes. The mixture was aged for 30 minutes and subsequently a mixture of 100 parts of methyl ethyl ketone and 2 parts of a polymerization initiator (ABN-E: available form Wako Pure Chemical Industries, Ltd.) was dropped at a constant rate over 120 minutes. After the completion of the dropping, the internal temperature was maintained for 60 minutes followed by cooling, and then 100 parts of methyl ethyl ketone was added to prepare a polymeric dispersant. The weight average molecular weight of the obtained polymeric dispersant was 40,000 and the average number of oxyethylene units (B) in the polymeric dispersant was 500.

(Preparation Of Coloring Material Dispersion II)

A methyl ethyl ketone solution of the above polymeric dispersant A and C. I. Pigment Blue 15:3, which is a commercially available pigment, were put into a kneading machine having twin screws and kneaded until a uniform mixture was obtained. Subsequently, the internal pressure was reduced to remove the solvent by distillation, while maintaining the internal temperature to 80° C. A sheet of the kneaded mixture was formed by means of a two-roll machine and moved into a container, where predetermined amounts of ion exchanged water and a neutralizing agent, which was sodium hydroxide, were added to the sheet and the mixture was agitated to obtain coloring material dispersion II with a pigment concentration of 10% and a polymeric dispersant concentration of 10%.

(Preparation Of Ink 2)

| coloring material dispersion II | 10.0 parts |
| compound b (number of oxyethylene units: 10) | 0.1 parts |
| glycerin | 5.0 parts |
| diethylene glycol | 10.0 parts |
| isopropyl alcohol | 3.0 parts |
| ion exchanged water | 71.9 parts |

The above listed ingredients were mixed thoroughly and filtered by means of a micro-filter with a pore diameter of 3 μm to obtain the target ink.

Example 3

Preparation Of Polymeric Dispersant B 300 parts of methyl ethyl ketone was put into a 4-mouthed glass-made flask equipped with a reflux tube, a dropping funnel, a thermometer and an agitation unit and heated until refluxing took place steadily from the reflux tube, while agitating the solution. The internal temperature was 84° C. A mixture solution of 34 parts of octadecylmethacrylate, 17 parts of diethyleneglycolmonomethyletheracrylate, 40 parts of methacrylic acid and 4 parts of a polymerization initiator (ABN-E: available from Wako Pure Chemical Industries, Ltd.) was dropped at a constant rate over 180 minutes. The mixture was aged for 30 minutes and subsequently a mixture of 100 parts of methyl ethyl ketone and 2 parts of ABN-E were dropped at a constant rate over 120 minutes. After the completion of the dropping, the internal temperature was maintained for 60 minutes followed by cooling, and then 100 parts of methyl ethyl ketone was added to prepare a polymeric dispersant. The weight average molecular weight of the obtained polymeric dispersant was 12,000 and the average number of oxyethylene units in the polymeric dispersant was 20.

(Preparation Of Coloring Material Dispersion III)

A methyl ethyl ketone solution of the above polymeric dispersant B and C. I. Pigment Blue 15:3, which is a commercially available pigment, were put into a kneading machine having twin screws and kneaded until a uniform mixture was obtained. Subsequently, the internal pressure was reduced to remove the solvent by distillation, while maintaining the internal temperature to 80° C. A sheet of the kneaded mixture was formed by means of a tworoll machine and moved into a container, where predetermined amounts of ion exchanged water and a neutralizing agent, which was sodium hydroxide, were added to the sheet and the mixture was agitated to obtain coloring material dispersion III with a pigment concentration of 16% and a polymeric dispersant concentration of 2%.

(Preparation Of Ink 3)

| coloring material dispersion III | 25.0 parts |
| compound c (number of oxyethylene units: 100) | 1.1 parts |
| glycerin | 5.0 parts |
| diethylene glycol | 10.0 parts |
| isopropyl alcohol | 3.0 parts |
| ion exchanged water | 55.9 parts |

The above listed ingredients were mixed thoroughly and filtered by means of a micro-filter with a pore diameter of 3 μm to obtain the target ink.

Example 4

Preparation Of Polymeric Dispersant C

Synthesis of AB type di-block copolymer having a hydrophobic block and a hydrophilic block:

The inside of a glass container equipped with a three-way cock was substituted by nitrogen and heated to 250° C. to remove the adsorbed water in a nitrogen gas atmosphere. The system was cooled to the room temperature and 12 millimoles of isobutylvinylether, 16 millimoles of ethyl acetate, 0.1 millimoles of 1-isobutoxyethylacetate and 11 cm³ of toluene were added. When the system temperature got to 0° C., 0.2 millimoles of ethylaluminumsesquichloride was added to initiate polymerization and synthesize block A of an AB type di-block copolymer.

After confirming the completion of the polymerization of the block A by periodically monitoring the molecular weight by means of gel permeation chromatography (GPC), the synthesis was conducted by adding 24 millimoles of a vinyl monomer obtained by sililating the hydroxyl groups of 2-(2-hydroxyethoxy)ethylvinylether (block B) by means of trimethylchlorosilane. The polymerization reaction was terminated by adding a 0.3% ammonia/methanol solution to the system and the sililated hydroxyl groups sililated by trimethylchlorosilane were hydrolyzed by adding water. After the reaction, the mixture solution was diluted by adding dichloromethane and washed with a 0.6N solution of hydrochloric acid for three times and subsequently with distilled water for three times and then condensed and dried to solid by means of an evaporator to obtain an AB type di-block copolymer (polymeric dispersant C). The compound was identified by means of NMR and GPC (Mn=3.6×10⁴, Mw/Mn=1.2). The average number of oxyethylene units in the polymeric dispersant was 400.

(Preparation Of Coloring Material Dispersion IV)

12.0 parts of C. I. Pigment Blue 15:3, which is a commercially available pigment, and 90.0 parts of tetrahydrofuran were mixed, heated to 40° C. and agitated well to produce a uniform mixture solution. The mixture solution was then added to a solution of 90.0 parts of tetrahydrofuran and 10.0 parts of the above polymeric dispersant C and subsequently 78.0 parts of water was added thereto. Thereafter, the tetrahydrofuran was removed by means of a rotary evaporator to obtain coloring material dispersion IV, where the concentration of the pigment was 12% and that of the polymeric dispersant was 10%.

(Preparation Of Ink 4)

| coloring material dispersion IV | 25.0 parts |
| compound d (number of oxyethylene units: 20) | 2.0 parts |
| glycerin | 5.0 parts |
| diethylene glycol | 10.0 parts |
| isopropyl alcohol | 3.0 parts |
| ion exchanged water | 55.0 parts |

The above listed ingredients were mixed thoroughly and filtered by means of a micro-filter with a pore diameter of 3 μm to obtain the target ink.

Example 5

Preparation Of Polymeric Dispersant D

Synthesis of ABC type tri-block copolymer having a hydrophobic block and two hydrophilic blocks:

The inside of a glass container equipped with a three-way cock was substituted by nitrogen and heated to 250° C. to remove the adsorbed water in a nitrogen gas atmosphere. The system was cooled to the room temperature and 12 millimoles of n-octadecylvinylether, 16 millimoles of ethyl acetate, 0.1 millimoles of 1-isobutoxyethylacetate and 11 cm³ of toluene were added. When the system temperature got to 0° C., 0.2 millimoles of ethylaluminumsesquichloride was added to initiate polymerization and synthesize ingredient A for an ABC type tri-block copolymer.

After confirming the completion of the polymerization of the ingredient A by periodically monitoring the molecular weight by means of gel permeation chromatography (GPC), 1 millimole of 2-(2-(2-(2-methoxyethoxy) ethoxy)ethoxy)ethylvinylether (ingredient B) was added to continue the polymerization. Similarly, after confirming the completion of the polymerization of the ingredient B by monitoring the molecular weight by means of GPC, the synthesis was conducted by adding 12 millimoles of a vinyl monomer obtained by esterifying the carbonic acid part of 6-(2-vinyloxyethoxy)hexanoic acid (ingredient C) by means of an ethyl group. The polymerization reaction was terminated by adding a 0.3% ammonia/methanol solution to the system and the esterified carboxyl group was hydrolyzed in a sodium hydroxide/methanol solution to turn it into a carbonic acid type. Thereafter, an ABC type tri-block copolymer (polymeric dispersant D) was obtained as in Example 4. The compound was identified by means of NMR and GPC (Mn=3.1×10⁴, Mw/Mn=1.1). The average number of oxyethylene units in the polymeric dispersant was 20.

(Preparation Of Coloring Material Dispersion V)

12.0 parts of C. I. Pigment Blue 15:3, which is a commercially available pigment, and 90.0 parts of tetrahydrofuran were mixed, heated to 40° C. and agitated well to produce a uniform mixture solution. The mixture solution was then added to a solution of 90.0 parts of tetrahydrofuran and 10.0 parts of the above polymeric dispersant D and subsequently 78.0 parts of an aqueous solution of lithium hydroxide containing lithium of the equivalent amount was added thereto as a neutralizing agent for the anionic hydrophilic group of the polymeric dispersant. Thereafter, the tetrahydrofuran was removed by means of a rotary evaporator to obtain coloring material dispersion V, where the concentration of the pigment was 12% and that of the polymeric dispersant was 10%.

(Preparation Of Ink 5)

| coloring material dispersion V | 25.0 parts |
| compound e (number of oxyethylene units: 20) | 0.35 parts |
| glycerin | 6.0 parts |
| triethylene glycol | 6.0 parts |
| trimethylol propane | 6.0 parts |
| polyethylene glycol (number of oxyethylene units: 22) | 0.5 parts |
| ion exchanged water | 56.15 parts |

The above listed ingredients were mixed thoroughly and filtered by means of a micro-filter with a pore diameter of 3 μm to obtain the target ink.

Example 6

Preparation Of Coloring Material Dispersion VI 12.0 parts of C. I. Pigment Blue 15:3, which is a commercially available pigment, and 90.0 parts of tetrahydrofuran were mixed, heated to 40° C. and agitated well to produce a uniform mixture solution. The mixture solution was then added to a solution of 90.0 parts of tetrahydrofuran and 4.0 parts of the above polymeric dispersant D and subsequently 84.0 parts of an aqueous solution of sodium hydroxide containing sodium of the equivalent amount was added thereto as a neutralizing agent for the anionic hydrophilic group of the polymeric dispersant. Thereafter, the tetrahydrofuran was removed by means of a rotary evaporator to obtain coloring material dispersion VI, where the concentration of the pigment was 12% and that of the polymeric dispersant was 4%.

(Preparation Of Ink 6)

| | |
|---|---|
| coloring material dispersion VI | 25.0 parts |
| compound f (number of oxyethylene units: 40) | 0.5 parts |
| glycerin | 6.0 parts |
| triethylene glycol | 6.0 parts |
| trimethylol propane | 6.0 parts |
| polyethylene glycol (number of oxyethylene units: 22) | 1.0 portion |
| ion exchanged water | 55.5 parts |

The above listed ingredients were mixed thoroughly and filtered by means of a micro-filter with a pore diameter of 3 μm to obtain the target ink.

Example 7

Preparation Of Coloring Material Dispersion VII 12.0 parts of C. I. Pigment Blue 15:3, which is a commercially available pigment, and 90.0 parts of tetrahydrofuran were mixed, heated to 40° C. and agitated well to produce a uniform mixture solution. The mixture solution was then added to a solution of 90.0 parts of tetrahydrofuran and 16.0 parts of the polymeric dispersant D of Example 5 and subsequently 72.0 parts of an aqueous solution of sodium hydroxide containing sodium of the equivalent amount was added thereto as a neutralizing agent for the anionic hydrophilic group of the polymeric dispersant. Thereafter, the tetrahydrofuran was removed by means of a rotary evaporator to obtain coloring material dispersion VII, where the concentration of the pigment was 12% and that of the polymeric dispersant was 16%.

(Preparation Of Ink 7)

| | |
|---|---|
| coloring material dispersion VII | 25.0 parts |
| compound g (number of oxyethylene units: 60) | 1.0 portion |
| glycerin | 6.0 parts |
| triethylene glycol | 6.0 parts |
| trimethylol propane | 6.0 parts |
| polyethylene glycol (number of oxyethylene units: 22) | 2.0 parts |
| ion exchanged water | 54.0 parts |

The above listed ingredients were mixed thoroughly and filtered by means of a micro-filter with a pore diameter of 3 μm to obtain the target ink.

Example 8

Preparation Of Coloring Material Dispersion VIII 12.0 parts of C. I. Pigment Blue 15:3, which is a commercially available pigment, 4 parts of the above compound h (number of oxyethylene units: 60) and 90.0 parts of tetrahydrofuran were mixed, heated to 40° C. and agitated well to produce a uniform mixture solution. The mixture solution was then added to a solution of 90.0 parts of tetrahydrofuran and 16.0 parts of the polymeric dispersant D of Example 5 and subsequently 68.0 parts of an aqueous solution of sodium hydroxide containing sodium of the equivalent amount was added thereto as a neutralizing agent for the anionic hydrophilic group of the polymeric dispersant. Thereafter, the tetrahydrofuran was removed by means of a rotary evaporator to obtain coloring material dispersion VIII, where the concentration of the pigment was 12% and that of the polymeric dispersant was 16%.

(Preparation of Ink 8)

| | |
|---|---|
| coloring material dispersion VIII | 25.0 parts |
| glycerin | 6.0 parts |
| triethylene glycol | 6.0 parts |
| trimethylol propane | 6.0 parts |
| polyethylene glycol (number of oxyethylene units: 22) | 2.0 parts |
| ion exchanged water | 55.0 parts |

The above listed ingredients were mixed thoroughly and filtered by means of a micro-filter with a pore diameter of 3 μm to obtain the target ink.

COMPARATIVE EXAMPLE 1

Preparation of Ink 9

| | |
|---|---|
| coloring material dispersion I | 50.0 parts |
| glycerin | 5.0 parts |
| diethylene glycol | 10.0 parts |
| isopropyl alcohol | 3.0 parts |
| ion exchanged water | 32.0 parts |

The above listed ingredients were mixed thoroughly and filtered by means of a micro-filter with a pore diameter of 3 μm to obtain the ink.

COMPARATIVE EXAMPLE 2

Preparation of Ink 10

| | |
|---|---|
| coloring material dispersion II | 10.0 parts |
| glycerin | 5.0 parts |
| diethylene glycol | 10.0 parts |
| isopropyl alcohol | 3.0 parts |
| ion exchanged water | 72.0 parts |

The above listed ingredients were mixed thoroughly and filtered by means of a micro-filter with a pore diameter of 3 pm to obtain the ink.

(Evaluation)

The inks of Examples 1 through 8 and Comparative Example 1 and 2 were tested for dispersion stability of the inks, ejection characteristics of the inks, color developability and abrasion resistance. For evaluating color developability, abrasion resistance and ejection characteristics of the inks, each of the inks was loaded on an ink jet recording apparatus P-660CII (available from Canon Finetech Inc.) having an on-demand type multi recording head that is adapted to eject ink by applying thermal energy to the ink according to a recording signal, and then an image was printed on a sheet of glossy paper SP101 (available from Canon Inc.). Table 2 below summarily shows the obtained results. As seen from Table 2, all the inks of Examples showed a good dispersion stability and a good ejection stability when compared with those of Comparative Examples. Additionally, all the inks of Examples showed a good color developability and a good abrasion resistance of the printed image.

TABLE 2

|  | Oxyethylene group ratio*1 | Dispersion stability*2 | Intermittent ejection property*3 | Continuous ejection property*4 | Color developability*5 | Abrasion resistance*6 |
|---|---|---|---|---|---|---|
| Example 1 | — | B | B | B | B | B |
| Example 2 | 0.02 | A | B | B | A | B |
| Example 3 | 5 | A | B | B | A | B |
| Example 4 | 0.05 | A | A | B | A | B |
| Example 5 | 1 | A | A | A | A | A |
| Example 6 | 2 | A | A | A | A | A |
| Example 7 | 3 | A | A | A | A | A |
| Example 8 | 3 | A | A | A | A | A |
| Comp. Ex. 1 | — | B | B | B | C | D |
| Comp. Ex. 2 | — | C | D | D | C | C |

*1) Oxyethylene Group Ratio:

The ratio of the number of units of the oxyethylene group in the auxiliary ingredient to that of the oxyethylene group in the polymeric dispersant, which is computationally determined by means of the formula shown below.

oxyethylene group ratio=number of oxyethylene units in auxiliary ingredient/number of oxyethylene units in polymeric dispersant

*2) Dispersion Stability:

Each of the inks was heated at 100° C. for 4 hours and a thermal stability test was conducted on the heated ink. The particle size of the ink was measured before and after the test and the rate of increase of the particle size (%) was determined by means of the formula shown below to measure the dispersion stability of the ink. The dynamic light scattering method (Laser Particle Size Analysis System PARIII: tradename, available from Ohtsuka Electronics Co., Ltd.) was used to gauge the particle size. particle size increase ratio(%) = (particle size after test−particle size before test)/particle size before test×100

A: The particle size increase ratio (%) is less than 5%.
B: The particle size increase rate (%) is not less than 5% and less than 10%.
C: The particle size increase rate (%) is not less than 10% and less than 30%.
D: The particle size increase rate (%) is not less than 30%.

*3) Evaluation of Intermittent Ejection Property:

Each of the inks was stored at 60° C. for 2 months, subsequently used to print a 100% solid image in an environment of a temperature of 15° C. and a relative humidity of 10%, followed by 3 minute suspension and again used to print a 100% solid image, and the printed image was evaluated by means of the following rating criteria.

A: No white stripe was observed and the image was printed properly.
B: White stripes were observed in the initial part of the printing.
C: White stripes were observed in the entire image.
D: Practically no image was printed.

*4: Evaluation of Continuous Ejection Property

A gradation pattern of a post card size was printed repeatedly and continuously to produce 1,000 sheets, and the 1,000 th image was evaluated for print dot misalignment and ink ejection failure by means of the following rating criteria.

A: No print dot misalignment and ink ejection failure was observed and the image was printed properly.
B: No ink ejection failure was observed but pint dot misalignment was observed in parts.
C: Ink ejection failure was observed in parts and print dot misalignment was observed over the entire image.
D: Ink ejection failure was frequently observed and print dot misalignment was observed over the entire image.

*5) Color Developability:

An image was printed by each of the inks stored at 60° C. for 2 months and the image was evaluated by means of the following rating criteria.

A: No ink bleeding was observed and the saturation of the image was high.
B: No ink bleeding was observed but the saturation of the image fell to a certain extent.
C: Ink bleeding was observed.
D: Ink bleeding was frequently observed and the saturation was low.

*6) Abrasion Resistance:

After printing images by means of the respective inks, tap water was sprayed on the image carrying surfaces of the recording materials and a Kimwipe (tradename) paper that was loaded with a weight of 500 g/12.56 cm$^2$ was put on each of the images and driven to reciprocate five times. Then, each of the images was evaluated for stains in the plain paper part and the extent of abrasion of the solid image part and the printed character part by means of the following rating criteria.

A: No stain was observed at all in the plain paper part and the solid image part and the printed character part were not abraded.
B: Practically no stain was observed in the plain paper part and the solid image part and the printed character part were not abraded.
C: Slight stains were observed in the plain paper part and the solid image part and the printed character part were slightly abraded.
D: Stains were observed in the plain paper part and the solid image part and the printed character part were partly abraded away.

INDUSTRIAL APPLICABILITY

As described above, according to the present invention, it is possible to provide an ink that can record high quality images with a high degree of fastness for a long period of time. It is also possible to provide an ink jet recording method, an ink cartridge and an ink jet recording apparatus that can record high quality images with a high degree of fastness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority benefits of Japanese Patent Application No. 2005-321776 filed on Nov. 7, 2005, the entire disclosure of which is incorporated herein by reference in its entirety.

What is claimed is:

1. An ink jet aqueous ink mainly containing a water-insoluble coloring material in an aqueous medium, containing as an auxiliary ingredient at least one ethylene oxide adduct of esters formed from sterins and hydroxyl fatty acids.

2. The ink jet aqueous ink according to claim 1, wherein the water-insoluble coloring material is a coloring material dispersion in which a pigment is dispersed by a polymeric dispersant.

3. The ink jet aqueous ink according to claim 1, wherein the water-insoluble coloring material is a coloring material dispersion in which a pigment is dispersed with a polymeric dispersant and the auxiliary ingredient.

4. The ink jet aqueous ink according to claim 2 or 3, wherein the polymeric dispersant is comprised of at least a monomer having an anionic hydrophilic group, a monomer having an oxyethylene group and a monomer having a hydrophobic group.

5. The ink jet aqueous ink according to claim 2 or 3, wherein the polymeric dispersant is a block copolymer comprised of a hydrophobic block comprising at least one vinyl ether and a hydrophilic block comprising at least one vinyl ether.

6. The ink jet aqueous ink according to claim 2 or 3, wherein the polymeric dispersant comprises a hydrophilic block comprised of at least a block comprising a vinyl ether having a nonionic hydrophilic group and a block comprising a vinyl ether having an anionic hydrophilic group.

7. The ink jet aqueous ink according to claim 2 or 3, wherein the polymeric dispersant is at least comprised of a block comprising a hydrophobic vinyl ether, a block comprising a hydrophilic vinyl ether having a nonionic hydrophilic group and a block comprising a hydrophilic vinyl ether having an anionic hydrophilic group, arranged in the mentioned order.

8. The ink jet aqueous ink according to claim 1, wherein the auxiliary ingredient is at least one ethylene oxide adduct of an ester formed from a sterin selected from the group consisting of cholesterin, lanosterin and agnosterin and a hydroxyl fatty acid.

9. The ink jet aqueous ink according to claim 3, wherein the auxiliary ingredient is at least one ethylene oxide adduct of an ester formed from a sterin selected from the group consisting of cholesterin, lanosterin and agnosterin and a hydroxyl fatty acid.

10. The ink jet aqueous ink according to claim 1, further containing polyethylene glycol.

11. An ink jet recording method comprising applying an ink onto a recording material by applying energy to the ink to cause it to fly, wherein the ink is an ink according to any one of claims 1 through 3 and 8 through 10.

12. The ink jet recording method according to claim 11, wherein the energy is thermal energy.

13. The ink jet recording method according to claim 11, wherein the recording material is a recording material having a coating layer adapted to receive ink on at least one of the surfaces thereof.

14. An ink cartridge having an ink storage portion storing an ink, wherein the ink is an ink according to any one of claims 1 through 3 and 8 through 10.

15. An ink jet recording apparatus comprising an ink cartridge having an ink storage portion storing an ink and a head portion for ejecting the ink, wherein the ink is an ink according to any one of claims 1 through 3 and 8 through 10.

* * * * *